(12) United States Patent
Wu et al.

(10) Patent No.: US 10,797,803 B2
(45) Date of Patent: Oct. 6, 2020

(54) WAVEFORM MATCHING BASED OPTICAL DIGITAL SIGNAL RECEIVING DEVICE

(71) Applicant: Shanghai Jiao Tong University, Shanghai (CN)

(72) Inventors: Guiling Wu, Shanghai (CN); Sitong Wang, Shanghai (CN); Yiwei Sun, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 16/686,402

(22) Filed: Nov. 18, 2019

(65) Prior Publication Data

US 2020/0083961 A1    Mar. 12, 2020

Related U.S. Application Data

(63) Continuation of application No. PCT/CN2018/114489, filed on Nov. 8, 2018.

(30) Foreign Application Priority Data

Mar. 29, 2018   (CN) .......................... 2018 1 0271976

(51) Int. Cl.
*H04B 10/60*    (2013.01)
*H04B 10/69*    (2013.01)
(Continued)

(52) U.S. Cl.
CPC ......... *H04B 10/695* (2013.01); *H04L 7/0075* (2013.01); *H04B 10/50* (2013.01); *H04B 10/60* (2013.01)

(58) Field of Classification Search
CPC ...... H04B 10/695; H04B 10/50; H04B 10/60; H04B 10/524; H04B 10/6165; H04B 10/63; H04L 7/0075
(Continued)

(56) References Cited

U.S. PATENT DOCUMENTS 5,287,212 A * 2/1994 Cox ..................... H04B 10/564
398/183
5,371,625 A * 12/1994 Wedding .......... H04B 10/25137
398/141

(Continued)

FOREIGN PATENT DOCUMENTS

CN        101604998 A     12/2009
CN        107703696 A     2/2018

*Primary Examiner* — Dibson J Sanchez
(74) *Attorney, Agent, or Firm* — Mei & Mark LLP; Manni Li

(57) ABSTRACT

A waveform matching based optical digital signal receiving device sequentially comprises an optical arbitrary waveform generator unit, an electro-optic modulator unit, an opto-electric converter unit, an electric filter unit, a sampling and judging module, a digital signal processing unit and a bit-timing extracting module. Accordingly, signal matched filtering, sampling and judgment can be effectively carried out in the optical domain, and the influence of noises on signal reception can be eliminated to the maximum extent, thereby achieving accurate detection and reception of signals. Meanwhile, compared with a conventional electric receiving device, the digital signal receiving device provided by the present invention breaks the limitation of "electronic bottleneck," and greatly improves the bandwidth of signal reception, which allows digital signal reception at a higher speed.

6 Claims, 2 Drawing Sheets

(51) Int. Cl.
  *H04L 7/00* (2006.01)
  *H04B 10/50* (2013.01)
(58) Field of Classification Search
  USPC .............. 398/115–117, 140–172, 182–214
  See application file for complete search history.

(56) References Cited

U.S. PATENT DOCUMENTS

| | | | | |
|---|---|---|---|---|
| 5,625,722 | A * | 4/1997 | Froberg | H04B 10/505 341/68 |
| 6,154,301 | A * | 11/2000 | Harvey | H04B 10/6911 398/1 |
| 6,671,079 | B2 * | 12/2003 | Fuller | H04B 10/5051 359/264 |
| 7,215,721 | B2 * | 5/2007 | Hietala | H04L 1/004 375/317 |
| 7,382,985 | B2 * | 6/2008 | Roberts | H04B 10/25137 398/147 |
| 8,111,986 | B1 * | 2/2012 | Lindsay | H04B 10/0799 398/16 |
| 8,989,596 | B2 * | 3/2015 | Saunders | H04B 10/70 398/140 |
| 10,116,390 | B2 * | 10/2018 | Ling | H04B 10/25133 |
| 10,404,496 | B1 * | 9/2019 | Azenkot | H04L 7/0025 |
| 2002/0141694 | A1 * | 10/2002 | Caplan | H04B 10/5051 385/24 |
| 2003/0002121 | A1 * | 1/2003 | Miyamoto | H04B 10/5561 398/185 |
| 2003/0007216 | A1 * | 1/2003 | Chraplyvy | H04B 10/5561 398/147 |
| 2003/0189975 | A1 | 10/2003 | Fullerton | |
| 2005/0191059 | A1 * | 9/2005 | Swenson | H04B 10/2581 398/159 |
| 2005/0271394 | A1 * | 12/2005 | Whiteaway | H04B 10/25133 398/188 |
| 2006/0007969 | A1 * | 1/2006 | Barnett | H04B 10/508 372/26 |
| 2006/0088321 | A1 * | 4/2006 | Cheung | H04B 10/5561 398/195 |
| 2006/0210282 | A1 * | 9/2006 | Iannelli | H04B 10/505 398/186 |
| 2006/0239694 | A1 * | 10/2006 | Turitsyn | H04J 14/02 398/149 |
| 2008/0080608 | A1 * | 4/2008 | Mobin | H04L 25/03057 375/233 |
| 2008/0138065 | A1 * | 6/2008 | Fukuchi | H04B 10/677 398/25 |
| 2009/0097538 | A1 * | 4/2009 | Aziz | H04L 25/03019 375/232 |
| 2009/0175631 | A1 | 7/2009 | Ikushima et al. | |
| 2010/0067902 | A1 * | 3/2010 | Sun | H04B 10/0799 398/25 |
| 2010/0201345 | A1 * | 8/2010 | Gupta | H03M 1/1042 324/96 |
| 2012/0076508 | A1 * | 3/2012 | Mezer | H04B 10/697 398/210 |
| 2013/0183046 | A1 * | 7/2013 | Blanchette | H01S 3/06758 398/186 |
| 2015/0222359 | A1 * | 8/2015 | Kai | H04B 10/541 398/115 |
| 2019/0339588 | A1 * | 11/2019 | Zou | H04L 7/0331 |
| 2020/0106520 | A1 * | 4/2020 | Wu | H04B 10/071 |

* cited by examiner

WAVEFORM MATCHING BASED OPTICAL DIGITAL SIGNAL RECEIVING DEVICE

CROSS-REFERENCE TO RELATED APPLICATIONS

The subject application is a continuation of PCT/CN2018/114489 filed on Nov. 8, 2018, which in turn claims priority on Chinese Application No. 201810271976.0 filed on Mar. 29, 2018 in China. The contents and subject matter of the PCT international application and the Chinese priority application are incorporated herein by reference.

TECHNICAL FIELD

The present invention relates to signal reception, particularly, a waveform matching based optical digital signal receiving device.

BACKGROUND ART

The detection and reception of digital signals with an ultra-low signal-to-noise ratio are often required in the fields of communication and radar due to self-limitation of channels or needs for secure communication and interference resistance. Matched filtering of signals at receiving terminals can eliminate the influence of noises to the maximum extent and is an effective way to realize accurate detection and reception of digital signals with ultra-low signal-to-noise ratio.

At present, ultra-wideband communication and radar have higher requirements on frequency and bandwidth. In an electric domain broadband communication systems, due to the limitation of the "electronic bottleneck," the implementation of the matched filtering reception of the high-speed serial data is facing challenges in processing frequency, bandwidth, and accuracy, and can hardly meet the current and future application requirements.

Photonic technology has the advantages of ultra-wideband, ultra-high speed, high precision, and the like, which are not available in electronic technology and can effectively overcome the defects of the electronic technology. High-frequency broadband signal processing based on photonic technology has become the focus of the current research. However, there is no scheme based on photonic technology to realize matched filtering digital signal reception until now.

SUMMARY OF THE INVENTION

To overcome the above defects in the existing technology, the present invention provides a digital signal receiving device which realizes signal matched filtering in the optical domain based on optical pulse profile. In the device of the present invention, signal matched filtering, sampling and judgment can be effectively carried out in the optical domain, and the influence of noises on signal reception can be eliminated to the maximum extent, thereby achieving accurate detection and reception of signals. Meanwhile, compared with a conventional electric receiving device, the digital signal receiving device provided by the present invention breaks the limitation of "electronic bottleneck," and greatly improves the bandwidth of signal reception, which allows digital signal reception at a higher speed.

The technical solution of the present invention is as follows:

a waveform matching based optical digital signal receiving device comprises an optical arbitrary waveform generating module, and is characterized in that a periodic optical pulse sequence with an arbitrary pulse profile is generated, an electro-optic intensity modulator, an opto-electric converter, an electric filter, a sampling and judging module and a digital signal processing unit are sequentially arranged in an optical output direction of the optical arbitrary waveform generating module, a first output terminal of the digital signal processing unit is connected with a control terminal of the optical arbitrary waveform generating module, a second output terminal of the digital signal processing unit is connected with a judging threshold input terminal of the sampling and judging module, a synchronous output terminal of the optical arbitrary waveform generating module is connected with a first port of a bit-timing extracting module, a second port of the bit-timing extracting module is connected with the sampling and judging module, a third port of the bit-timing extracting module is connected with a third output terminal of the digital signal processing unit, the bit-timing extracting module receives control of the digital signal processing unit through the third port to enable the sampling and judging module to perform sampling and judgment at a peak value of an electrical filtered signal in each period, and a to-be-received signal is input into a modulation terminal of the electro-optic intensity modulator.

In the present invention, the optical arbitrary waveform generating module generates the periodic optical pulse sequence with a controllable time-domain profile and a controllable phase according to the control of the digital signal processing unit, and the periodic optical pulse sequence is input into the electro-optic intensity modulator; the modulation terminal of the electro-optic intensity modulator receives the to-be-received electrical signal and outputs an optical pulse sequence which is modulated by the to-be-received signal; the optical pulse sequence is firstly sent into the opto-electric converter to be converted into an electrical signal, and then the electrical signal is sent into the electric filter to be filtered; the sampling and judging module extracts a peak value of an output signal of the electric filter in each period, and performs "0"-"1" judgment according to a judging threshold set by the digital signal processing unit; and the digital signal processing unit receives a judging result and processes the judging result to recover a digital signal sent by a sending terminal.

In the present invention, the optical pulse sequence generated by the optical arbitrary waveform generating module has a period T identical to a period of the to-be-received digital signal, the optical arbitrary waveform generating module is controlled by the digital signal processing unit to enable each single optical pulse to have a profile; $p_s(t)$ similar to an electrical pulse waveform $s_1(t)$ of code "1" in the received digital signal, i.e. $p_s(t)=K_1 s_1(t)$, $K_1$ being a constant, and enable the phase of the output optical pulse sequence to coincide with a phase of a digital signal in the received signal within one period during electro-optic intensity modulation. Besides, the synchronous output terminal of the optical arbitrary waveform generating module outputs a periodic signal with a period identical to the period of the generated optical pulse sequence.

In the present invention, the bit-timing extracting module receives the periodic pulse signal output by the synchronous terminal of the arbitrary waveform generating module, performs phase adjustment and locking under control of the digital signal processing unit, and provides a sampling clock for the sampling and judging module such that the sampling and judging module always performs sampling at the peak value of the filtered electrical signal in each period.

In the present invention, a time-domain width of an impulse response of the electric filter is larger than a time-domain pulse width of each single optical pulse and smaller than the repetition period $T_s$ of the optical pulse sequence, and a bandwidth of the electric filter is smaller than a bandwidth of the opto-electric converter.

In the present invention, the judging threshold provided by the digital signal processing unit (6) to the sampling and judging module (5) takes an average value of code "1" and code "0" in a sampling result.

In the present invention, the optical pulse time-domain profile $p_s(t)$ is adjusted to make a system equivalent impulse response $h_A(t)$ approximately satisfy a matched filtering condition: $h_A(t)=Kp_s(T_s-t)=KK_1s_1(T_s-t)$, K being a constant.

In the present invention, the optical arbitrary waveform generating module and the bit-timing extracting module adjust an initial phase of the optical pulse sequence and the sampling clock of the sampling and judging module according to feedback of the digital signal processing unit. The phase of the optical pulse sequence and the phase of the digital signal are aligned at the modulator such that matched filtering is carried out with best effects, and the sampling and judging module performs sampling at the peak value of the filtered electrical signal in each period, thereby minimizing the influence of noises.

Based on the above technical features, the present invention has the following advantages:

according to the device of the present invention, signal matched filtering, sampling and judgment can be effectively carried out in the optical domain, and the influence of noises on signal reception can be eliminated to the maximum extent, thereby achieving accurate detection and reception of signals. Meanwhile, compared with a conventional electric receiving device, the digital signal receiving device provided by the present invention breaks the limitation of "electronic bottleneck", and greatly improves the bandwidth of signal reception, which allows digital signal reception at a higher speed.

DETAILED DESCRIPTION OF THE INVENTION

The present invention is further illustrated in conjunction with the following figures and examples. The embodiments are implemented on the basis of the technical solutions of the invention and provide detailed embodiments and processes, but the scope of the invention is not limited to the following embodiments.

Figure 1:
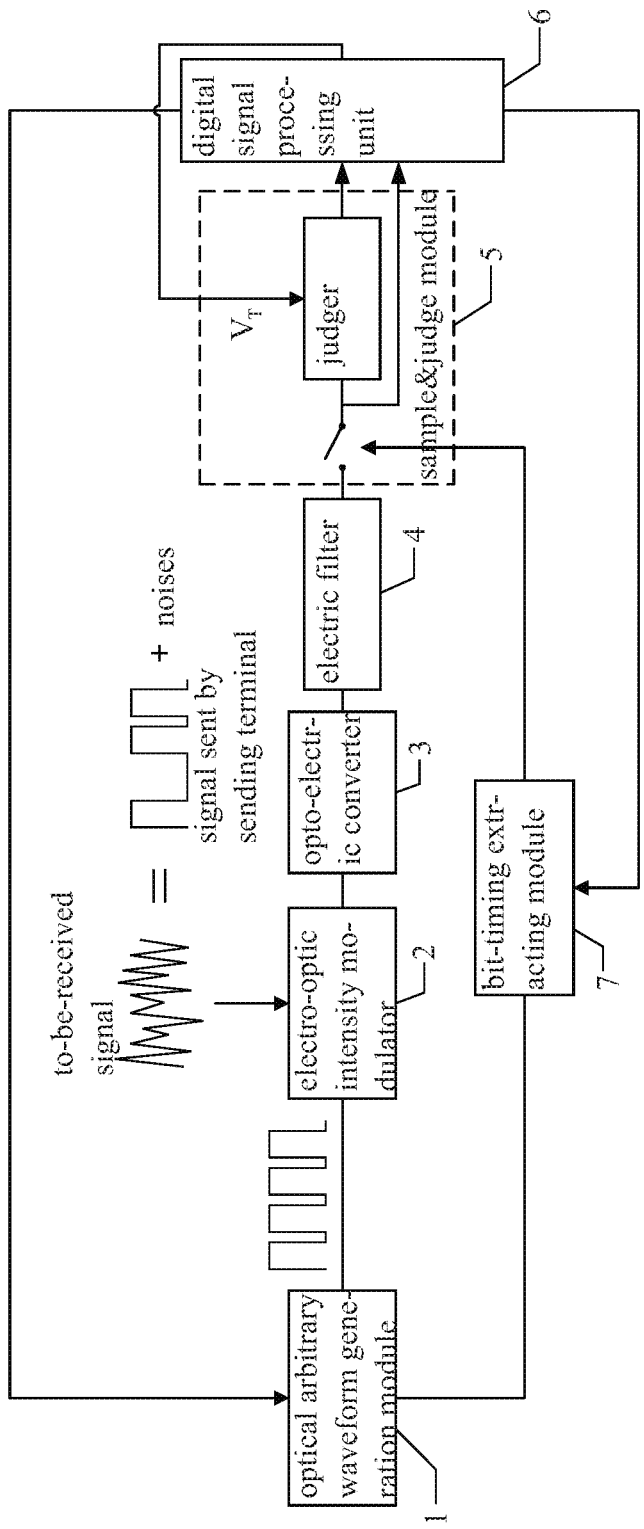
FIG. 1 is a block diagram showing the waveform matching based optical digital signal receiving device of the present invention.

As shown in FIG. 1, the waveform matching based optical digital signal receiving device of the present invention comprises an optical arbitrary waveform generating module 1, electro-optic intensity modulator 2, an opto-electric converter 3, an electric filter 4, a sampling and judging module 5, a digital signal processing unit 6, and a bit-timing extracting module 7.

The optical arbitrary waveform generating module 1 (which is an optical arbitrary waveform generator, OAWG) generates a periodic optical pulse sequence having a repetition frequency identical to a rate of a to-be-received digital signal, both being $f_s$, and is controlled by the digital signal processing unit 6 to adjust a pulse profile and a phase of the optical pulse sequence according to a corresponded waveform of the to-be-received digital signal (a 0-1 return-to-zero pattern is adopted in this embodiment). Finally, the optical arbitrary waveform generating module 1 outputs the optical pulse sequence which has a repetition frequency of $f_s$ and is controllable in time-domain profile and phase, as shown in FIG. 2.

Figure 2:
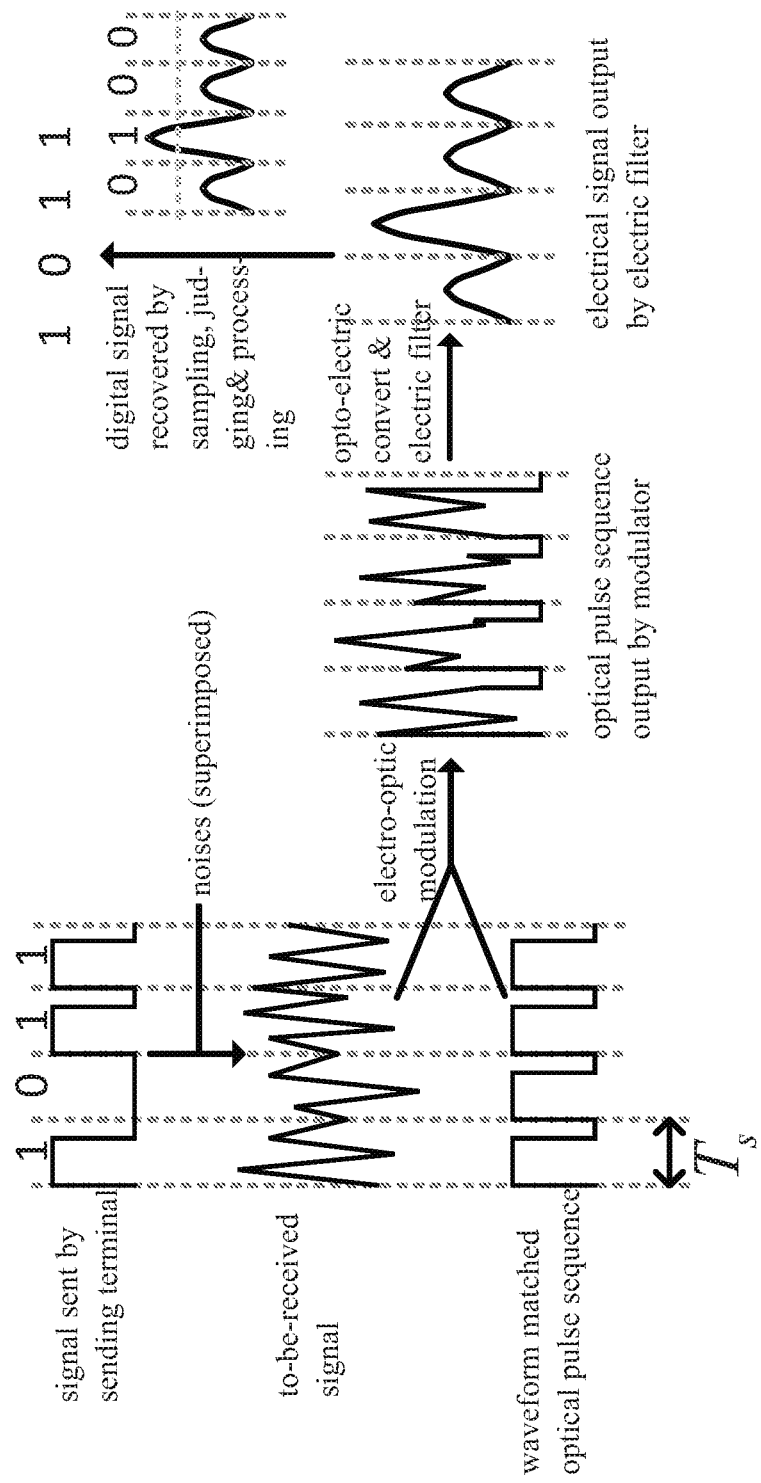
FIG. 2 is a schematic diagram showing a signal receiving process (taking a 0-1 return-to-zero pattern as an example) in the present invention.

The electro-optic intensity modulator 2 (which is a Mach-Zehnder electro-optic modulator) modulates the optical pulse sequence with the to-be-received signal, as shown in FIG. 2. The output of the electro-optic intensity modulator 2 is an optical pulse sequence modulated by the to-be-received signal, as shown in FIG. 2.

The opto-electric converter 3 and the electric filter 4 convert the optical signal into an electrical signal and filter the electrical signal. The filtered signal, as shown in FIG. 2, is input into the sampling and judging module 5.

The sampling and judging module 5 comprises a sampling part and a judging part, the sampler samples the input signal at sampling times according to a clock signal input by the bit-timing extracting module 7 and sends a sampling result to the judger and the digital signal processing unit 6, and the judger performs judgment on the sampling result according to a judging threshold (an average value of code "1" and code "0" in the sampling result) set by the digital signal processing unit 6 and sends a judging result to the digital signal processing unit 6.

The digital signal processing unit 6 receives a user instruction to configure the optical arbitrary waveform generating module 1 so as to control the pulse profile and the phase of the optical pulse sequence. The profile of each single optical pulse is enabled to be similar to an electrical pulse waveform of code "1" in the digital signal, and the phase of the optical pulse sequence is controlled according to the sampling result output by the sampling and judging module 5 in a manner that fine adjustment is carried out in one period such that the phase of the optical pulse sequence coincides with the phase of the digital signal in the received signal within one period during electro-optic intensity modulation.

The bit-timing extracting module 7 receives a periodic signal output by a synchronous terminal of the arbitrary waveform generating module 1, performs phase adjustment and locking under the control of the digital signal processing unit 6, and provides the sampling clock for the sampling and judging module 5 such that the sampling and judging module 5 always performs sampling at the peak value of the filtered electrical signal in each period.

The digital signal processing unit 6 processes the judging result input by the sampling and judging module 5, thereby obtaining the digital signal sent by the sending terminal.

The above description only provides preferred embodiments of the invention and is not intended to limit the invention, and various changes, equivalents and improvements made without departing from the spirit and principles of the invention shall fall into the protection scope of the invention.

We claim:

1. A waveform matching based optical digital signal receiving device, comprising
   an optical arbitrary waveform generating module (1) for generating a periodic optical pulse sequence with an arbitrary pulse profile, the optical arbitrary waveform generating module (1) having an optical output direction, a control terminal, and a synchronous output terminal, an electro-optic intensity modulator (2) having a modulation terminal, an opto-electric converter (3), an electric filter (4), a sampling and judging module (5) having a judging threshold input terminal, a digital signal processing unit (6) having a first output terminal, a second output terminal, a third output terminal, and a bit-timing extracting module (7) having a first port, a second port, and a third port, wherein the optical arbitrary waveform generating module (1), the electro-optic intensity modulator (2), the opto-electric converter (3), the electric filter (4), the sampling and judging module (5), and the digital signal processing unit (6) are sequentially arranged in the optical output direction of the optical arbitrary waveform generating module (1), the first output terminal of the digital signal processing unit (6) is connected with the control terminal of the optical arbitrary waveform generating module (1), the second output terminal of the digital signal processing unit (6) is connected with the judging threshold input terminal of the sampling and judging module (5), the synchronous output terminal of the optical arbitrary waveform generating module (1) is connected with the first port of a bit-timing extracting module (7), the second port of the bit-timing extracting module (7) is connected with the sampling and judging module (5), the third port of the bit-timing extracting module (7) is connected with the third output terminal of the digital signal processing unit (6), the bit-timing extracting module (7) receives control of the digital signal processing unit (6) through the third port to enable the sampling and judging module (5) to perform sampling and judgment at a peak value of an electrical filtered signal in each period, and a to-be-received signal is input into the modulation terminal of the electro-optic intensity modulator (2); and wherein the optical arbitrary waveform generating module (1) generates the periodic optical pulse sequence with a controllable time-domain profile and a controllable phase according to the control of the digital signal processing unit (6), and the periodic optical pulse sequence is input into the electro-optic intensity modulator (2);

the modulation terminal of the electro-optic intensity modulator (2) receives the to-be-received signal and outputs an optical pulse sequence modulated by the to-be-received signal;

the optical pulse sequence is firstly sent into the opto-electric converter (3) to be converted into an electrical signal, and then the electrical signal is sent into the electric filter (4) to be filtered;

the sampling and judging module (5) extracts a peak value of an output signal of the electric filter (4) in each period, and performs "0"-"1" judgment according to a judging threshold set by the digital signal processing unit (6); and the digital signal processing unit (6) receives a judging result and processes the judging result to recover a digital signal sent by a sending terminal.

2. The waveform matching based optical digital signal receiving device according to claim 1, wherein the optical pulse sequence generated by the optical arbitrary waveform generating module (1) has a period Ts identical to a period of the to-be-received signal, the optical arbitrary waveform generating module (1) is controlled by the digital signal processing unit (6) to enable each single optical pulse to have a profile $p_s(t)$ similar to an electrical pulse waveform $s1(t)$ of code "1" in the received digital signal, wherein $ps(t)=K1s1(t)$, K1 is a constant, and enables a phase of the output optical pulse sequence to coincide with a phase of a digital signal in the received signal within one period during electro-optic intensity modulation, and the synchronous output terminal of the optical arbitrary waveform generating module (1) outputs a periodic signal with a period identical to the period of the generated optical pulse sequence.

3. The waveform matching based optical digital signal receiving device according to claim 1, wherein the bit-timing extracting module (7) receives a periodic pulse signal output by the synchronous terminal of the arbitrary waveform generating module (1), performs phase adjustment and locking under control of the digital signal processing unit (6), and provides a sampling clock for the sampling and judging module (5) such that the sampling and judging module (5) performs sampling at the peak value of the filtered electrical signal in each period.

4. The waveform matching based optical digital signal receiving device according to claim 1, wherein a time-domain width of an impulse response of the electric filter (4) is larger than a time-domain pulse width of each single optical pulse and smaller than a repetition period Ts of the optical pulse sequence, and a bandwidth of the electric filter (4) is smaller than a bandwidth of the opto-electric converter (3).

5. The waveform matching based optical digital signal receiving device according to claim 1, wherein the judging threshold provided by the digital signal processing unit (6) to the sampling and judging module (5) takes an average value of code "1" and code "0" in a sampling result.

6. The waveform matching based optical digital signal receiving device according to claim 1, wherein the optical pulse time-domain profile $p_s(t)$ is adjusted to make a system equivalent impulse response $h_A(t)$ approximately satisfy a matched filtering condition: $h_A(t)=Kp_s(T_s-t)=KK_1s_1(T_s-t)$, wherein K is a constant.

* * * * *